United States Patent [19]

Sawa

[11] Patent Number: 5,583,433

[45] Date of Patent: Dec. 10, 1996

[54] APPARATUS FOR MEASURING LENGTH USING ULTRASONIC DELAY LINE AND MATCHING A PHASE OF DRIVE PULSE WITH REFLECTED PULSE

[75] Inventor: Masaaki Sawa, Kashiwa, Japan

[73] Assignee: Macome Corporation, Tokyo, Japan

[21] Appl. No.: 193,290

[22] Filed: Feb. 8, 1994

[30] Foreign Application Priority Data

Feb. 19, 1993 [JP] Japan .................................. 5-030188

[51] Int. Cl.$^6$ .............................. G01B 7/14; G01B 7/26; G01F 23/30
[52] U.S. Cl. .............................. 324/207.13; 324/207.24; 324/209; 333/148; 73/314
[58] Field of Search .......................... 324/207.12, 207.13, 324/207.15, 207.24, 207.25, 207.26, 209, 262, 239, 533; 333/148; 73/313, 316, 290 V; 367/127, 902; 364/571.01

[56] References Cited

U.S. PATENT DOCUMENTS

| 4,028,619 | 6/1977 | Edwards ............................ 324/207.13 |
| 4,952,873 | 8/1990 | Tellerman .......................... 324/207.13 |

FOREIGN PATENT DOCUMENTS

| 0022512 | 2/1982 | Japan .................................. 324/207.13 |
| 0037418 | 2/1984 | Japan .................................. 324/207.13 |

Primary Examiner—Sandra L. O'Shea
Assistant Examiner—Jay M. Patidar
Attorney, Agent, or Firm—Bauer & Schaffer

[57] ABSTRACT

A length measuring apparatus that uses an ultrasonic magnetostrictive delay line can detect a position with high accuracy by utilizing a reflected wave positively. In a measuring apparatus using an ultrasonic magnetostrictive delay line in which a wave transmitter (4) is disposed at one end of an ultrasonic magnetostrictive delay line (1), and the other end of the ultrasonic magnetostrictive delay line (1) is made an open end, a detecting coil (3) is wound around the outer periphery of the ultrasonic magnetostrictive delay line (1) over the whole area of the measuring range, a magnet piece (2) is disposed so as to become slidable along the ultrasonic magnetostrictive delay line (1) an a position of the magnet piece (2) is measured on the basis of a delay time of a detection pulse (B) produced in the detection coil (3) relative to a drive pulse (A) applied to the wave transmitter (4), a period ($T_1$) of the drive pulse (A) applied to the wave transmitter (4) is matched with a time in which a reflected wave (C) is generated at the ultrasonic magnetostrictive delay line (1) at its one end in which the wave transmitter (4) is disposed.

4 Claims, 2 Drawing Sheets

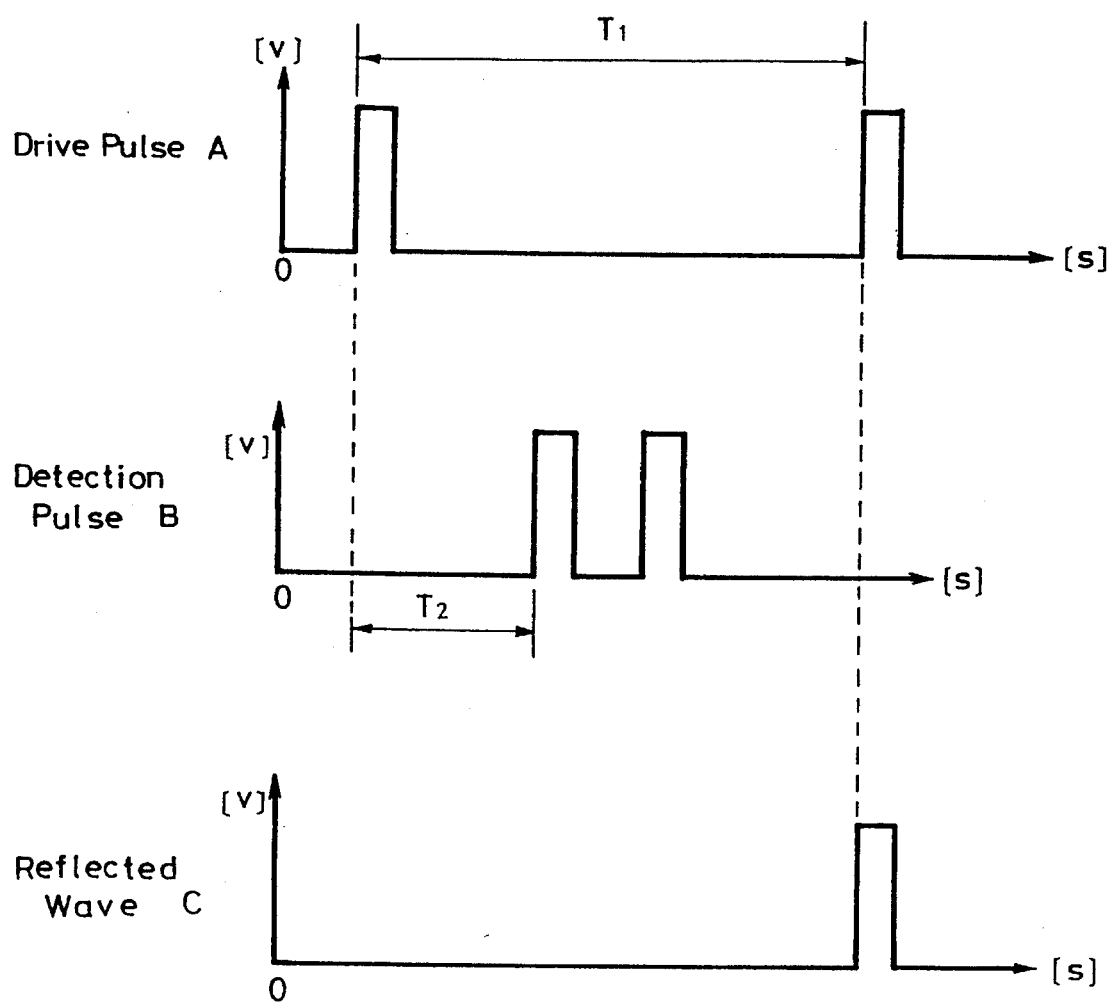

APPARATUS FOR MEASURING LENGTH USING ULTRASONIC DELAY LINE AND MATCHING A PHASE OF DRIVE PULSE WITH REFLECTED PULSE

BACKGROUND OF THE INVENTION

1. Field of the Invention

The present invention relates to a length measuring apparatus employing an ultrasonic magnetostrictive delay line in use, for example, in measuring a level surface of gasoline in a gasoline tank, detecting the stroke of a piston rod when assembled into a hydraulic cylinder or detecting positions of movable parts of a variety of industrial machines and so on.

2. Description of the Related Art

Length ultrasonic linear measuring apparatus that have hitherto been proposed use an ultrasonic magnetostrictive delay line whose length is extended or reduced with the application of a magnetic field. In the conventional measuring apparatus, a non-reflection supporting member made of a shock-absorbing material, such as a rubber or the like, is attached to one end portion of the ultrasonic magnetostrictive delay line in order to damp an undesired reflected wave generated by ultrasonic vibration.

In the above conventional measuring apparatus it is difficult to damp the undesired reflected wave completely. Thus, reflected ultrasonic waves cross each other so as to interfere with the detection pulse whereby the detection pulse is disturbed. This results in the disadvantage that position cannot be detected with high accuracy.

Further, if strong ultrasonic vibration were generated in order to obtain a stable and large detection pulse, it would become impossible to damp reflected waves and to gradually dissipate the reflected waves.

Furthermore, even when the undesired reflected wave is completely removed by using the non-reflection supporting member as described above, it is unavoidable that the whole of the apparatus becomes large in size due to the provision of the non-reflecting supporting member.

OBJECTS AND SUMMARY OF THE INVENTION

It is therefore an object of the present invention to provide an improved ultrasonic linear measuring apparatus in which the aforesaid shortcomings and disadvantages encountered with the prior art can be eliminated.

More specifically, it is an object of the present invention to provide a ultrasonic linear measuring apparatus using an ultrasonic magnetostrictive delay line in which the position of an object to be measured can be detected with high accuracy by positively utilizing the reflected wave without utilizing a non-reflection supporting member.

It is another object of the present invention to provide a ultrasonic linear measuring apparatus using an ultrasonic magnetostrictive delay line which can be miniaturized.

According to an aspect of the present invention, there is provided a length measuring apparatus using an ultrasonic magnetostrictive delay line which comprises an ultrasonic magnetostrictive delay line, a wave transmitter provided at one end of the ultrasonic magnetostrictive delay line, the other end of the ultrasonic magnetostrictive delay line being made an open end, a detection coil wound around the outer periphery of the ultrasonic magnetostrictive delay line over a whole area of a range to be measured, a magnet piece whose moving distance from the one end of the ultrasonic magnetostrictive delay line is to be measured disposed so as to become slidable along the ultrasonic magnetostrictive delay line, a drive pulse generator for generating a drive pulse which is supplied to the wave transmitter to cause an ultrasonic wave which propagates through the ultrasonic magnetostrictive delay line, a device for measuring a position of the magnet piece from the one end of the ultrasonic magnetostrictive delay line on the basis of a delay time of a detection pulse generated in the detection coil relative to a drive pulse applied to the wave transmitter, wherein a phase of the drive pulse is matched with a phase of a reflected wave in the end of the wave transmitter by making a period of the drive pulse applied to the wave transmitter coincident with a time in which a first reflected wave reaches the end of the ultrasonic magnetostrictive delay line.

BRIEF DESCRIPTION OF THE DRAWINGS

A better understanding of other objects, features, and advantages of the present invention can be gained from a consideration of the following detailed description of illustrative embodiments, in conjunction with the figures of the accompanying drawings, in which:

FIG. 3 is a diagram of waveforms of a drive pulse, a detection pulse and a reflected wave used in the present invention, and to which reference will be made in explaining operation of the length measuring apparatus according to the present invention, respectively.

DETAILED DESCRIPTION OF THE PREFERRED EMBODIMENTS

The measuring apparatus using an ultrasonic magnetostrictive delay line according to the present invention will hereinafter be described in detail with reference to FIGS. 1 through 3.

Figure 1:
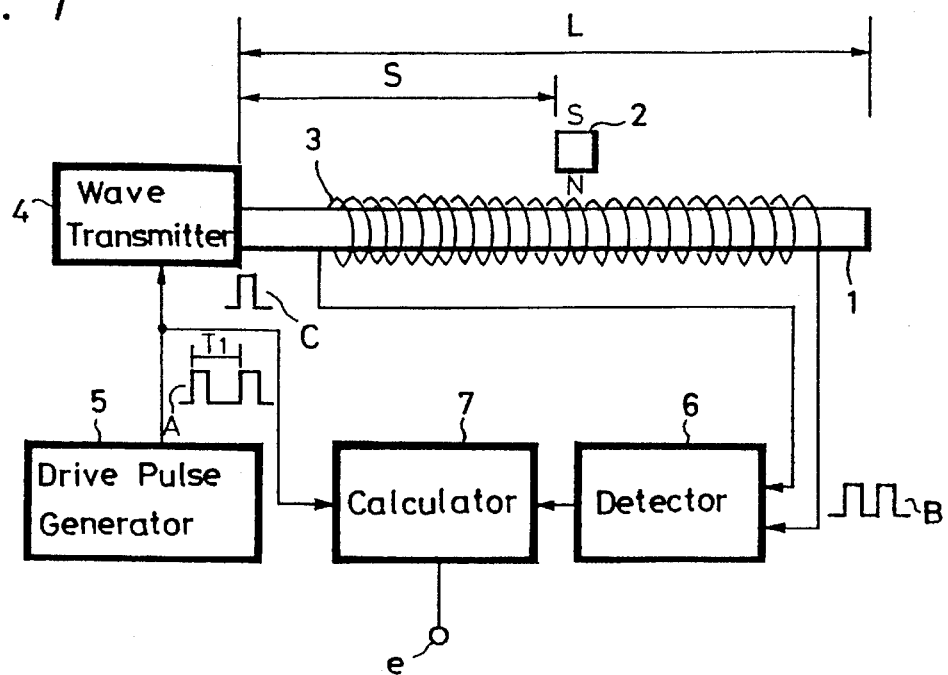
FIG. 1 is a schematic block diagram showing a first embodiment of a length measuring apparatus using an ultrasonic magnetostrictive delay line according to the present invention.

FIG. 1 shows a first embodiment of the measuring apparatus according to the present invention. As shown in FIG. 1, there is provided an ultrasonic magnetostrictive delay line 1. A magnet piece member 2 whose length S from one end of the ultrasonic magnetostrictive delay line 1 is to be measured is positioned in opposition to the ultrasonic magnetostrictive delay line 1 at a predetermined distance therefrom so as to be slidable along the length of the ultrasonic magnetostrictive delay line 1. A detection coil 3 is wound about the ultrasonic magnetostrictive delay line 1 over its whole area along the length of its measuring range. A wave transmitter 4 is disposed at one end of the ultrasonic magnetostrictive delay line 1 while the other end is left open or free. A drive pulse generator 5 is adapted to apply a predetermined drive pulse to the wave transmitter 4.

A detector 6 detects an induced voltage generated in the detection coil 3. A calculator 7 receives the drive pulse from the drive pulse generator 5 and the detection pulse from the detector 6 and then calculates the delay time of the detection pulse relative to the drive pulse to thereby output a signal corresponding to the delay time thereof, i.e., signal corresponding to a moving distance of the magnet member 2 is output from an output terminal e.

In the apparatus shown in FIG. 1, when an ultrasonic vibration is applied to the ultrasonic magnetostrictive delay line 1 from the wave transmitter 4 by the drive pulse A applied thereto from the drive pulse generator 5, the ultrasonic wave is propagated in the ultrasonic magnetostrictive delay line 1.

At that time, a pulse voltage is not induced in the detection coil 3 by only the detection coil 3. If the magnet piece member 2 is disposed close to the ultrasonic magnetostrictive delay line 1, then the ultrasonic magnetostrictive delay line 1 is partially magnetized by the magnet piece member 2. Therefore, due to a so-called reverse magnetostriction phenomenon (or VILLARI effect) in which a magnetic permeability of the ultrasonic magnetostrictive delay line 1 is reduced when the ultrasonic vibration passes the magnetized portion of the ultrasonic magnetostrictive delay line 1, a detection pulse B based on the induced voltage is generated in the detection coil 3. The detection pulse B is generated twice by the reflection at the open end of the ultrasonic magnetostrictive delay line 1 as shown in FIG. 3. The first detection pulse B is detected by the detector 6.

When the magnet piece 2 is moved along the ultrasonic magnetostrictive delay line 1, a delay time of the detection pulse B relative to the drive pulse A is changed in proportion to the distance the magnet piece 2 is moved from one end to the other of the ultrasonic magnetostrictive delay line 1. Accordingly, the drive pulse A from the drive pulse generator 5 and the first detection pulse B from the detector 6 are supplied to the calculator 7. Then, the calculator 7 calculates the delay time of the detection pulse B relative to the drive pulse A and outputs from the output terminal e a delay time, i.e., an output signal corresponding to a moving distance of the magnet piece 2.

The ultrasonic vibration transmitted from the wave transmitter 4 is propagated in the inside of the ultrasonic magnetostrictive delay line 1, repeatedly reflected from one to the other end thereof and then progressively damped to disappear.

Since the length L of the ultrasonic magnetostrictive delay line 1 is known beforehand, the apparatus is arranged such that a period $T_1$ in which the drive pulse A is generated by the drive pulse generator 5 is set to be the same as the period in which the reflected wave C based on the ultrasonic vibration travels through the length L of the ultrasonic magnetostrictive delay line 1.

When the first reflected wave C reflected on the open end of the ultrasonic magnetostrictive delay line 1 travels the length L, and arrives at and is reflected on the ultrasonic magnetostrictive delay line 1 at the end portion where the wave transmitter 4 is provided, the condition of the drive pulse generator 5 is set to generate the next drive pulse. In this manner the wave transmitter 4 is driven to generate a new ultrasonic wave whose phase becomes the same as that of the first reflected wave C.

As described above, a strong ultrasonic vibration with phases matched can be obtained by overlapping the reflected wave C on a new ultrasonic wave by the new or the second driving pulse A. Accordingly, a detected wave of large vibration with satisfactory S/N (signal-to-noise ratio) is generated and therefore the reflected wave need not be suppressed by the non-reflection supporting member. The measuring apparatus can thus be miniaturized by the space of the non-reflection supporting member.

A second embodiment of the length measuring apparatus using the ultrasonic magnetostrictive delay line 1 according to the present invention will be described below in detail with reference to FIG. 2. In FIG. 2, like parts corresponding to those of FIG. 1 are marked with the same references and therefore need not be described in detail.

Figure 2:
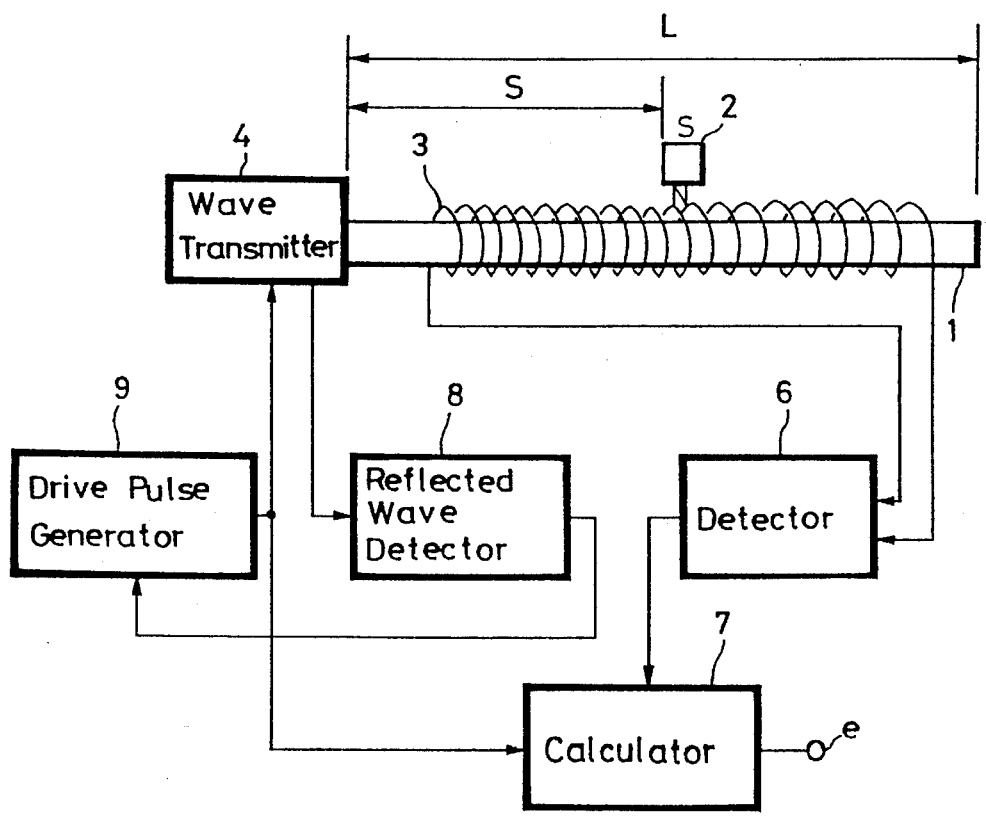
FIG. 2 is a schematic block diagram showing a second embodiment of the length measuring apparatus using an ultrasonic magnetostrictive delay line according to the present invention.

As shown in FIG. 2, there is provided a reflected wave detector 8. The length measuring apparatus according to the second embodiment shown in FIG. 2 is different from the measuring apparatus using the ultrasonic magnetostrictive delay line shown in FIG. 1 in that the reflected wave detector 8 detects when the first reflected wave C shown in FIG. 3 is returned to the wave transmitter 4. The detected output from the reflected wave detector 8 is supplied to a drive pulse generator 9 and that the drive pulse A' synchronized with the reflected wave C' is generated by the drive pulse generator 9 to thereby drive the wave transmitter 4. The drive pulse A from the drive pulse generator 9 is also supplied to the calculator 7.

The reflected wave C is detected and the drive pulse A synchronized with the reflected wave C is generated so that, when the length L of the ultrasonic magnetostrictive delay line 1 is varied, the drive period of the drive pulse A need not be adjusted in accordance with the length L of the ultrasonic magnetostrictive delay line 1. Also, when the drive period of the drive pulse A is changed with the change of temperature, the phase of the reflected wave C and that of the new ultrasonic wave can be prevented from being displaced.

According to this embodiment, since the wave transmitter 4 has a function to detect the reflected wave C, it is possible to measure the time $T_1$ in which the ultrasonic vibration travels back and forth within the ultrasonic magnetostrictive delay line 1. In this case when, $T_2$ assumes a time from the drive pulse A to the detection pulse B, L assumes the length of the ultrasonic magnetostrictive delay line 1, S assumes a distance from the wave transmitter 4 to the magnet piece 2, and V assumes a velocity at which the ultrasonic vibration propagates within the ultrasonic magnetostrictive delay line 1.

Then, $$T_1 = 2L/V \tag{1}$$

$$T_2 = S/V \tag{2}$$

Eliminating V from the above equations (1) and (2) yields the following equations (3) and (4):

$$T_2/T_1 = S/2L \tag{3}$$

$$S = T_2 \cdot 2L/T_1 \tag{4}$$

More specifically, even when the velocity V at which the ultrasonic wave vibration propagates is changed with the change of temperature, the position S of the magnet piece 2 can be calculated by calculating the above equations (3) and (4) regardless of the velocity V.

According to the embodiments of the present invention, since the phase of the reflected wave C and the phase of the drive pulse A are matched by making the period $T_1$ of the drive pulse A applied to the wave transmitter 4 coincident with the time in which the ultrasonic wave generated by the drive pulse A applied to the ultrasonic magnetostrictive delay line 1 from the wave transmitter 4 is reflected at the open end of the ultrasonic magnetostrictive delay line 1 and returned to the wave transmitter 4, the ultrasonic wave generated by the drive pulse A and the reflected wave C are synthesized at the same timing point. Therefore, an undesired reflected wave is not generated and the detection pulse B with high accuracy can be detected.

Further, according to the embodiments of the present invention, since the reflected wave C is detected by the wave transmitter 4 and the reflected wave detector 8 and the phase of the reflected wave C and that of the drive pulse A are matched with each other by applying the drive pulse A synchronized with the reflected wave C to the wave transmitter 4, the detection pulse B with high accuracy can be detected constantly.

Furthermore, according to the embodiments of the present invention, since a ratio between the time $T_1$ from the drive pulse A to the next drive pulse A and the time $T_2$ from the drive pulse A to the detection pulse B is calculated and the position signal corresponding to the distance S from the wave transmitter 4 to the magnet piece 2 is output, the position of the magnet piece 2 can be detected independently of the velocity V at which the drive pulse A is propagated.

Having described preferred embodiments of the invention with reference to the accompanying drawings, it is to be understood that the invention is not limited to those precise embodiments and that various changes and modifications could be effected therein by one skilled in the art without departing from the spirit or scope of the novel concepts of the invention as defined in the appended claims.

What is claimed is:

1. An ultrasonic linear measuring apparatus using an ultrasonic magnetostrictive delay line, comprising:

an ultrasonic magnetostrictive delay line;

a wave transmitter provided at one end of said ultrasonic magnetostrictive delay line, the other end of said ultrasonic wave magnetostrictive delay line being open;

a detection coil wound around the outer periphery of said ultrasonic magnetostrictive delay one over the whole area of the range to be measured;

a magnet slidably disposed along the length of said ultrasonic magnetostrictive delay line so that the distance it is moved from said one end of said ultrasonic magnetostrictive delay line is to be measured;

a drive pulse generator for generating a drive pulse supplied to said wave transmitter to cause an ultrasonic wave to propagate through said ultrasonic magnetostrictive delay line and be reflected from said open end;

phase matching means for matching at said one end the phase of said drive pulse with the phase of the reflected wave which is reflected from said open end of said ultrasonic wave magnetostrictive delay line by making the period of said drive pulse applied to said wave transmitter coincident with the period of said reflected wave when the reflected wave reaches said one end thereof; thereby synchronizing the reflected wave with the drive pulse and means for measuring the position of said magnet piece from said one end of said ultrasonic magnetostrictive delay line on the basis of the delay time of a detection pulse generated by said magnet piece in said detection coil relative to said drive pulse applied to said wave.

2. The measuring apparatus according to claim 1, further comprising reflected wave detecting means which detects said reflected wave and means for applying a detected reflected wave to said drive pulse generator to generate a drive pulse with said reflected wave to match the phase of said reflected wave and the phase of said drive pulse with each other.

3. The measuring apparatus according to claim 2, further comprising means for calculating the ratio $T_2/T_1$ where $T_1$ is the time from said drive pulse to the next drive pulse and $T_2$ is the time from said drive pulse to said detection pulse and means for outputting a position signal corresponding to a distance from said wave transmitter to said magnet piece.

4. The measuring apparatus according to claim 1, further comprising means for calculating the ratio $T_2/T_1$ where $T_1$ is the time from said drive pulse to the next drive pulse and $T_2$ is the time from said drive pulse to said detection pulse and means for outputting a position signal corresponding to a distance from said wave transmitter to said magnet piece.

* * * * *